US006012012A

United States Patent [19]

Fleck et al.

[11] Patent Number: 6,012,012

[45] Date of Patent: Jan. 4, 2000

[54] METHOD AND SYSTEM FOR DETERMINING DYNAMIC TRAFFIC INFORMATION

[75] Inventors: Gerhard Fleck, Meckenheim; Reinhold Mertens, Lauf, both of Germany

[73] Assignee: DeTeMobil Deutsche Telekom MobilNet GmbH, Bonn, Germany

[21] Appl. No.: 08/836,827

[22] PCT Filed: Mar. 12, 1996

[86] PCT No.: PCT/DE96/00436

§ 371 Date: Dec. 23, 1997

§ 102(e) Date: Dec. 23, 1997

[87] PCT Pub. No.: WO96/29688

PCT Pub. Date: Sep. 26, 1996

[30] Foreign Application Priority Data

| | | | |
|---|---|---|---|
| Mar. 23, 1995 | [DE] | Germany | 195 10 005 |
| Feb. 5, 1996 | [DE] | Germany | 196 04 084 |

[51] Int. Cl.[7] .......................... G08G 1/00; G06F 165/00

[52] U.S. Cl. .......................... 701/117; 701/200; 701/118; 701/119; 340/988; 340/995; 340/905; 340/934

[58] Field of Search .......................... 701/117–9, 200, 701/208–12, 118, 119, 209, 210, 211, 212; 340/988–90, 995, 905, 934

[56] References Cited

U.S. PATENT DOCUMENTS

| | | | |
|---|---|---|---|
| 5,173,691 | 12/1992 | Sumner | 340/995 |
| 5,296,852 | 3/1994 | Rathi | 701/117 |
| 5,845,227 | 12/1998 | Peterson | 701/117 |

FOREIGN PATENT DOCUMENTS

| | | |
|---|---|---|
| 715285 | 6/1996 | European Pat. Off. . |
| 4105584 | 2/1992 | Germany . |
| 4321437 | 2/1994 | Germany . |

*Primary Examiner*—Jacques H. Louis-Jacques
*Assistant Examiner*—Yonel Beaulieu
*Attorney, Agent, or Firm*—Baker & Maxham

[57] ABSTRACT

A method and system for determination of dynamic traffic information or traffic events. Relevant data from vehicle-mounted terminals are recorded automatically, by remote interrogation or manually, and transmitted directly, together with a location identifier, via a wide-coverage mobile-telephone network, for example, GSM, to other mobile-telephone subscribers and/or a higher level exchange. In the exchange, the incoming data are processed and fed to selected terminals and/or third parties. In addition, the results of interrogation, for example, braking behavior, can be pre-defined by a traffic-control center and transmitted by radio broadcast or mobile telephone system to the terminals of road users in a geographically limited area who can then "observe" the flow of traffic directly and immediately report incoming interrogation results by mobile telephone back to the exchange.

22 Claims, 5 Drawing Sheets

METHOD AND SYSTEM FOR DETERMINING DYNAMIC TRAFFIC INFORMATION

BACKGROUND OF THE INVENTION

1. Field of the Invention

This invention relates generally to traffic information for drivers, and more particularly to a method and system for providing dynamic information useful on a real time basis for roadway travelers.

2. Discussion of the Related Art

Traffic control and acquisition of traffic information have become indispensable because of the growing volume of traffic. Normally the prevailing dynamic traffic information may be acquired by:

fixed built-on accessories on roads, such as induction loops, cameras, emergency call boxes;

traffic counters or traffic detectors;

mobile traffic units, such as police, road service, helicopter;

weather information collecting systems; and a multitude of other information sources not mentioned here.

Disadvantages of the previous methods of obtaining traffic information include the great amount of personnel and materials required, the high cost associated with these methods, and the very long "reaction times" for some events such as accidents, congestion or weather-related traffic problems. Due to the enormous expense, complete coverage of an area in acquisition of traffic information based on sensors in the streets is virtually impossible, so that main areas of emphasis must always be established in data acquisition.

In addition, such a decentralized acquisition of traffic information presents problems when the information is to be compiled and processed centrally and relayed to third parties, such as police, road service personnel, and traffic participants.

German patent 4,105,584 discloses a traffic information system that works on the basis of a mobile communication system. Traffic information is transmitted from a central office to vehicles over an organization channel of the mobile communication system, where the information thus transmitted can be displayed visually and/or acoustically in the vehicle. In addition, means are provided for obtaining information regarding the location and/or movement of the vehicle and sending it to the central office. If a cellular mobile communication system is used, an approximate tracking of a vehicle on the basis of its position in a certain wireless cell is possible.

SUMMARY OF THE INVENTION

Therefore, an important purpose of the present invention is to provide a process and a system for determining dynamic traffic information that avoids the disadvantages mentioned above and makes it possible to obtain traffic information essentially directly from the vehicle with complete coverage of the subject area at a moderate expense.

Dynamic individual and collective information services require current and historical traffic flow information such as speed driven, prevailing traffic volume, braking and acceleration response, congestion reports, accident reports, and weather, among others, based on specific roadway segments. The same information forms the basis for qualitative and quantitative planning of expansion of the traffic network. This information can be obtained by mobile wireless transmission from vehicles on the road. To be able to assign the information to a certain location, it is also necessary to provide the corresponding vehicles with their own positioning device.

There is a great deal of interest in predicting traffic impediments and predetermining their effects through inventive recognition algorithms in the vehicle and in a central location, using this current traffic flow information plus historical values. In this way, traffic information can be updated very quickly, that is, recognized or deleted.

With this concept of "dynamic traffic flow information" based on the building blocks of telematics, such as a mobile wireless system, and a satellite-assisted positioning and navigation system, the most recent traffic flow information can be obtained from all roads with complete coverage of the area, or specific inquiries can be made.

According to one possible application of the invention, the traffic flow information collected by vehicle terminals is relayed to a regional control center. With this method, both traffic counts and speed determinations are possible. With this "mobile traffic data generation" the expenditures are much more cost-effective than with traditional methods using fixed built-in components in or on the roadways.

In particular, this provides for long-term acquisition of traffic information for specific stretches of road and/or specific events, and for compilation of a historical traffic database from this information for use in making predictions or for specific control of traffic data acquisition.

The traffic data acquisition can be controlled from the vehicle by reaching virtual acquisition points, that is, after starting a trip, the process of traffic data acquisition is not started until after reaching an acquisition point. The subsequent acquisition processes for specific stretches of road are also controlled by reaching certain acquisition points. If an acquisition point that would be passed on the basis of a preceding route is not reached within a predetermined period of time, the system assumes that the trip has been concluded or that the vehicle has left the data acquisition area (e.g., side streets) and the data acquisition process is terminated.

According to another possible application, especially in conjunction with accidents or congestion, such as when a vehicle is involved in an accident, a warning is sent from that vehicle to all vehicles in the vicinity of or approaching the accident site. Due to the high travel speeds, which are typical on German federal highways (BAB), the position information on the location of the accident plus historical travel position information for determining the direction of travel are transmitted to the mobile wireless system by using the fastest possible means of communication for this purpose.

This information is then sent directly without preprocessing to all mobile wireless subscribers that can be reached in the respective wireless cell or the neighboring wireless cells. However, preferably only those mobile wireless subscribers traveling in the direction of the accident site would be informed of the existing hazard.

It is suggested here that for individual traffic participants, the last portion of the route traveled could also be stored, preferably in the vehicle, in addition to the current position as a historical "position range" and used as "description of route to the site of the accident/congestion" in the event of an accident or congestion. This route description can then be appended to a corresponding warning for other traffic participants. Thus, the warning is specific not only with regard to the position of the event but also regarding the direction of travel or the trip route. In the case of an accident, it is advantageous for the accident information to be transmitted at the same time to the proper service center that will review the information and perform a plausibility analysis on it. Then after being reviewed, a confirmation is distributed to the relevant mobile wireless subscribers or the accident message is canceled. This all presupposes that the respective mobile wireless subscribers have a suitable terminal for receiving these messages.

It is advisable to conduct the remote scanning of traffic-relevant attributes at least partially for a specific stretch of roadway. Particularly in this regard, especially dangerous areas or node points of the traffic network can be monitored by accessing historical data from the standpoint of traffic flow. To do so, vehicles are selected by the service center for data acquisition, with the selection being made preferably on the basis of the historical traffic data. The acquisition of data is conducted in and/or between defined virtual acquisition areas that are fixed in advance or can be varied dynamically depending on the occurrence of an event such as congestion.

In addition, an event-based standard acquisition is provided, at least in part. This may be accomplished, for example, by direct instructions from the service center to the vehicles, or automatically, and is performed with complete coverage of the area, if possible. A return signal is sent back from the vehicles to the control center only when one or more predefined events have actually occurred such as operation of windshield wipers as a sign of rain, or braking operations. This return signal to the service center, supplemented by time and position information about the event, gives the control center an overview of the general traffic situation in the area covered.

For reasons of urgency or updating, a memory-expandable information container of the signaling channel may be used for communication between mobile wireless subscribers and the mobile wireless system. Such an information container is evaluated in the respective system node of the mobile wireless system (for example, the BSC of the GSM systems) and transmitted over broadcast functions in the relevant wireless cells. Thus it is not necessary to use a traffic channel that might not be available immediately due to an overload situation.

DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

Figure 1:
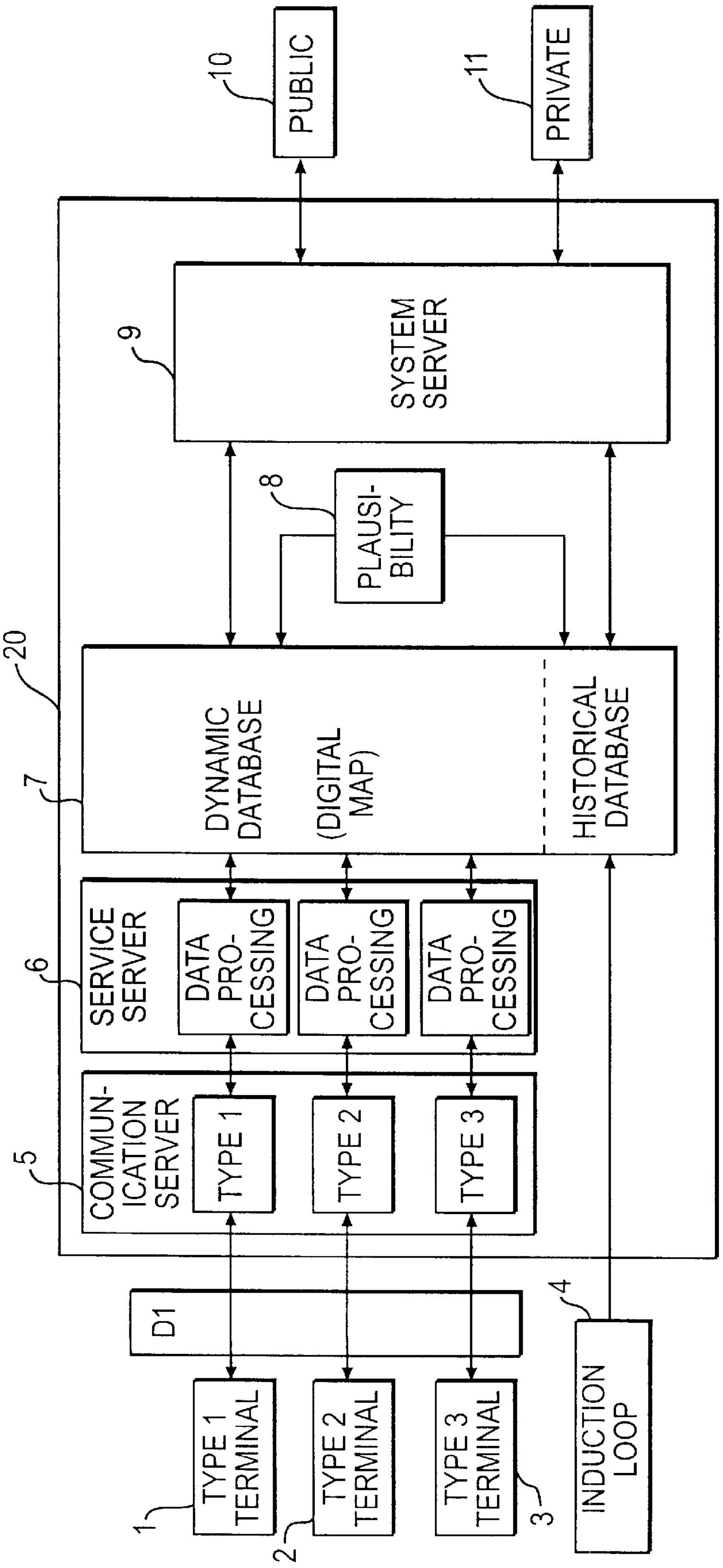
FIG. 1 is a block diagram of an example of functional units of the central acquisition office of the invention.

The method and system of the invention will be described in detail, with reference to the drawing figures.

A. Basic System Functions that are Preferably Needed for Dynamic Traffic Flow Acquisition 1. Installation of the application software in standardized terminals.

2. Definition of the recorded roadway segments by the service center operator and/or mobile terminal operator.

3. Conversion of these roadway segments into a geographical description (satellite positioning coordinates).

4. Definition of the attributes to be detected on this roadway segment, for example:

confirmation of through-travel on this section of roadway for the purpose of a traffic count, time information, actual travel time and speed to determine traffic impairments and for creating historical traffic databases, other relevant attributes involving the vehicle (brake lights, ABS information, rear fog light, windshield wiper, temperature sensor).

5. Transmission of the defined requirements from the service center to the terminal.

6. Functions of the terminal:

determination that this section of roadway has actually been traveled, determination of time information for ascertaining the actual travel time and/or determining the speed, determination of other relevant attributes involving the vehicle (brake lights, ABS information, rear fog light, windshield wiper, temperature sensor).

7. Transmission of the traffic flow information from the terminal to the service center.

8. Analysis of the traffic flow information in service centers and processing for relaying to other terminals and/or third parties.

The terminals consist of satellite-assisted navigation systems, mobile wireless communication functions and a module for the application function including the few operating functions required. The application software and operating data can be entered into the vehicle's terminal through a chip map, separate mechanical interfaces, or via mobile wireless interfaces, among others.

The required configuration parameters for acquisition of the dynamic traffic information and traffic events are likewise entered into the terminal via a chip map (for example, sent by mail), via mechanical interfaces, by individual point-for-point communication or distributed communication, among other possibilities.

The dynamic information for the geographical description of the section of roadway where the traffic-relevant events are to be detected may also be transmitted from the control center to the terminal:

via a separate interface on the terminal, via a chip map, through a procedure via mobile data communication, and/or through data distribution services in the mobile wireless system.

Figure 2:
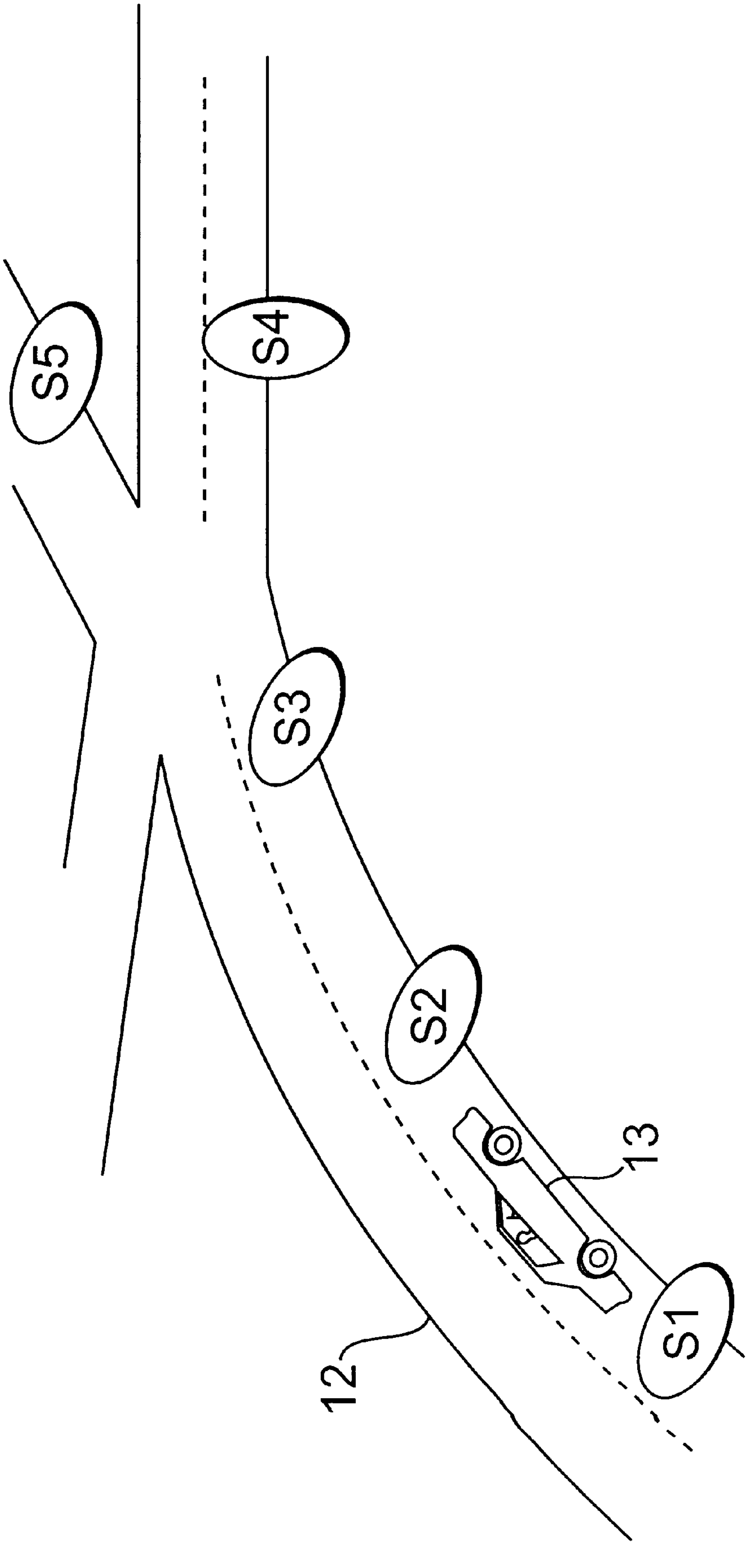
FIG. 2 is a schematic view of a portion of roadway showing an example of an application of traffic data acquisition according to this invention.

In the example according to FIG. 2, the application recognizes whether vehicle 13 on traffic route 12 has traveled through a defined acquisition area S1 and it determines the travel time up to acquisition area S2. If the given travel time is greatly exceeded, the segment of roadway defined by acquisition areas S1, S2 and the actual travel time are coded as "floating car data," optionally with additional vehicle information such as the operating status of brake lights, rear fog light, windshield wipers, ABS, etc., and transmitted by the mobile wireless system to central acquisition point 20 (see FIG. 1). On the basis of this correlation, the speeds of the vehicle determined by the vehicle's terminals are then allocated to the roadway segments.

Likewise, a simple count of vehicles and/or detection of traffic flow traveling through a certain roadway segment defined by acquisition areas S3, S4 is/are possible. Braking and acceleration of the vehicle are detected as event-based information and transmitted to the control center with position and time information.

Figure 5:
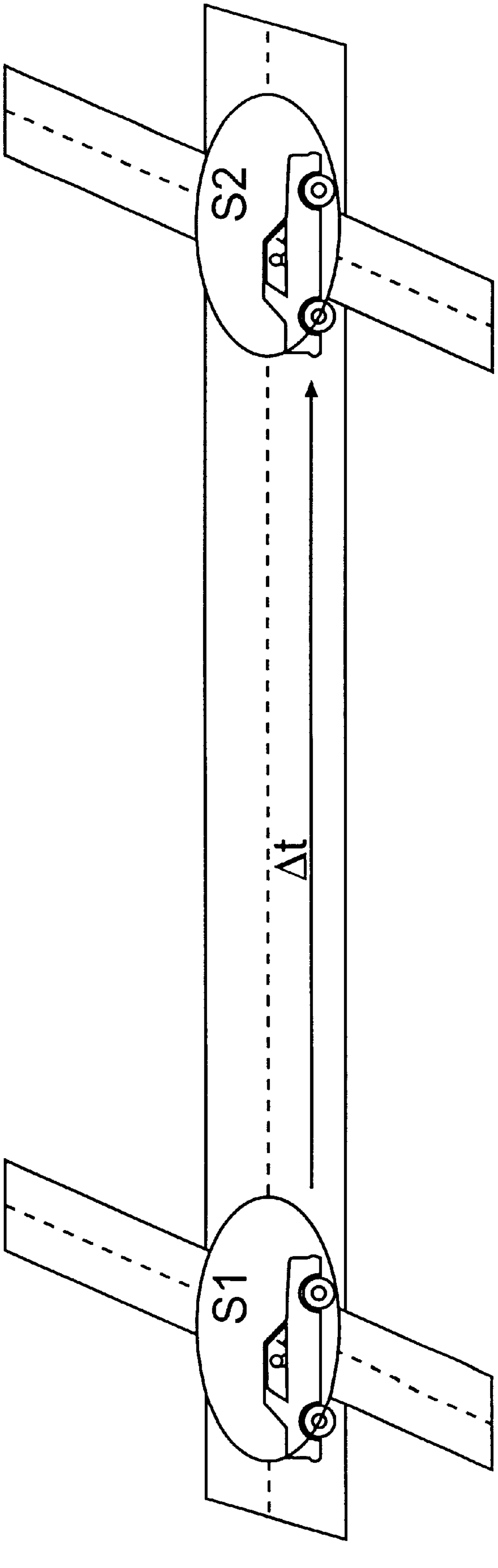
FIG. 5 shows a dynamic variation of the roadway acquisition areas in case of need.
Figure 6:
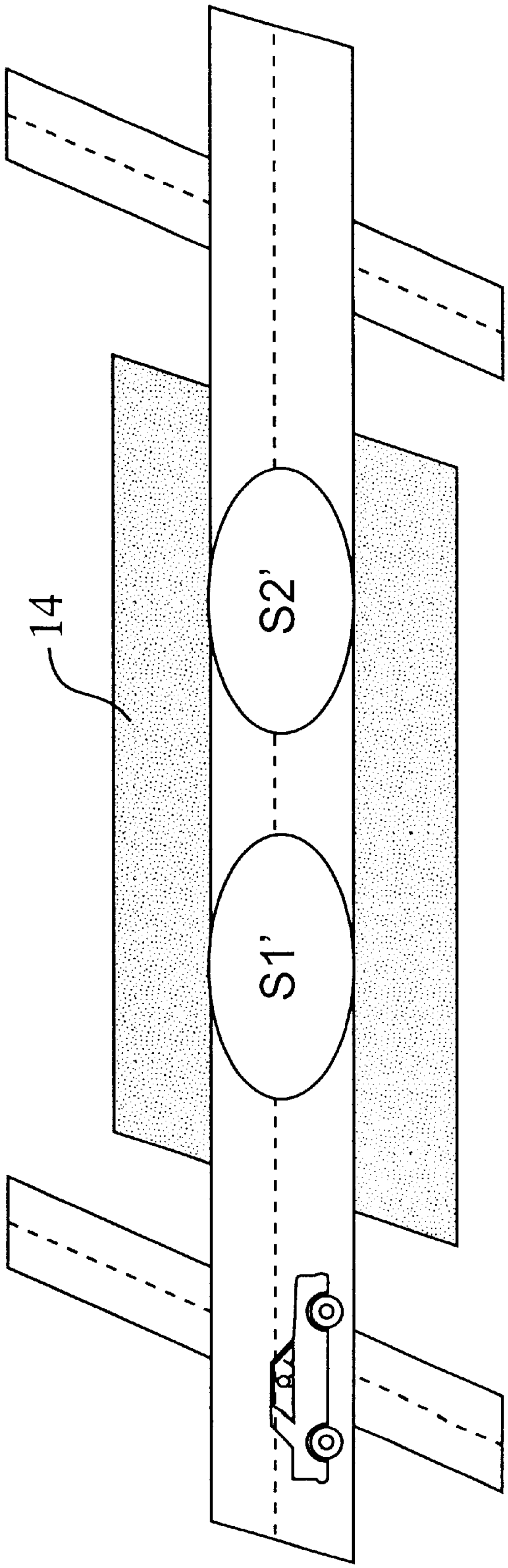
FIG. 6 is a view similar to FIG. 5 showing different circumstances.

As FIGS. 5 and 6 show, the positions of acquisition areas S1, S2 are at first preset in a fixed manner. However, on occurrence of a traffic-relevant event (congestion area 14) the acquisition area positions can be varied dynamically to S1' and S2' and adapted to the new traffic situation in such a way as to ensure the best possible data acquisition.

Figure 3:
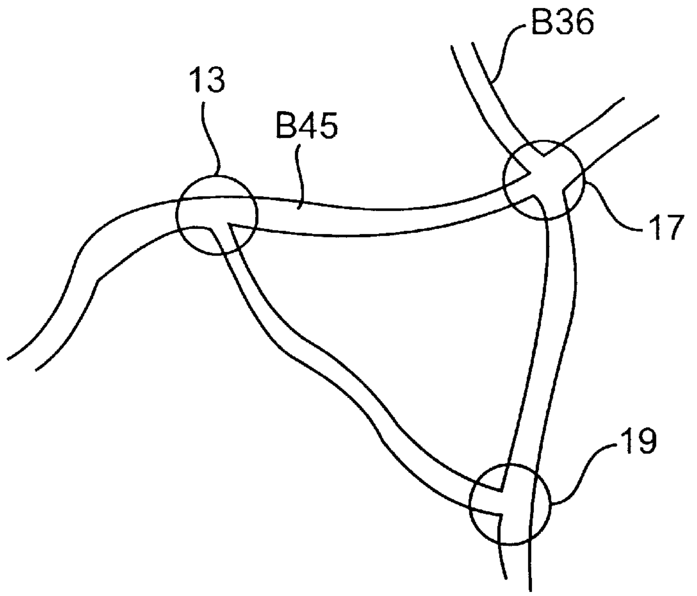
FIG. 3 is a top view of a portion of a roadway system showing another example of an application of traffic data acquisition according to this invention.

If event 14 occurs, the terminal recognizes this through the performance (braking) of the vehicle in the acquisition areas in question (S1, S2 and/or S1', S2') and a message is sent to control center 20 by mobile wireless means. An abrupt stoppage of the vehicle may be a sign of a collision or an accident. Sharp braking of a vehicle on a freeway is often an indication of the beginning of congestion. Slow driving is a sign of heavy traffic, etc. This message is linked to information regarding where the event occurred (for example, intersection 17 in FIG. 3) and the position range of the reporting vehicle (for example, the route from intersection 18 to intersection 17).

The information sent to control center 20 would thus be as follows, for example: event 14 has occurred at intersection 17 after traveling the route from intersection 18 to intersection 17. Control center 20 can then disseminate to all vehicles the information that event 14 (congestion) will occur if they travel through the segment of roadway from intersection 18 to intersection 17 as planned. The segment from intersection 18 to intersection 19 is mentioned as a possible detour. If this detour from the travel route is taken, a return signal is sent to control center 20. From the return signal from the vehicles, control center 20 can recognize whether the recommended detour has been taken. The information received is processed by the application function in control center 20 and the roadway information is assigned to a digital road map in a dynamic database 7. Furthermore, through geographic self-positioning in the vehicle, attention can be drawn to the impending end of the congestion just before the congestion, for example "warning: danger of collision."

By plausibility checks 8 in determining the deviations (using historical information, average information or information from other participants on this segment of roadway), prolonged travel times due to parking, mishaps, etc., can be prevented. In addition, traffic information reported back to the traffic participants can be transmitted with geographic accuracy and also logically, for example, by stating the names of roads.

In addition to the above-mention dynamic postprocessing of the traffic flow information, all traffic flow information is processed in compiled form and entered into a historical traffic database.

Figure 4:
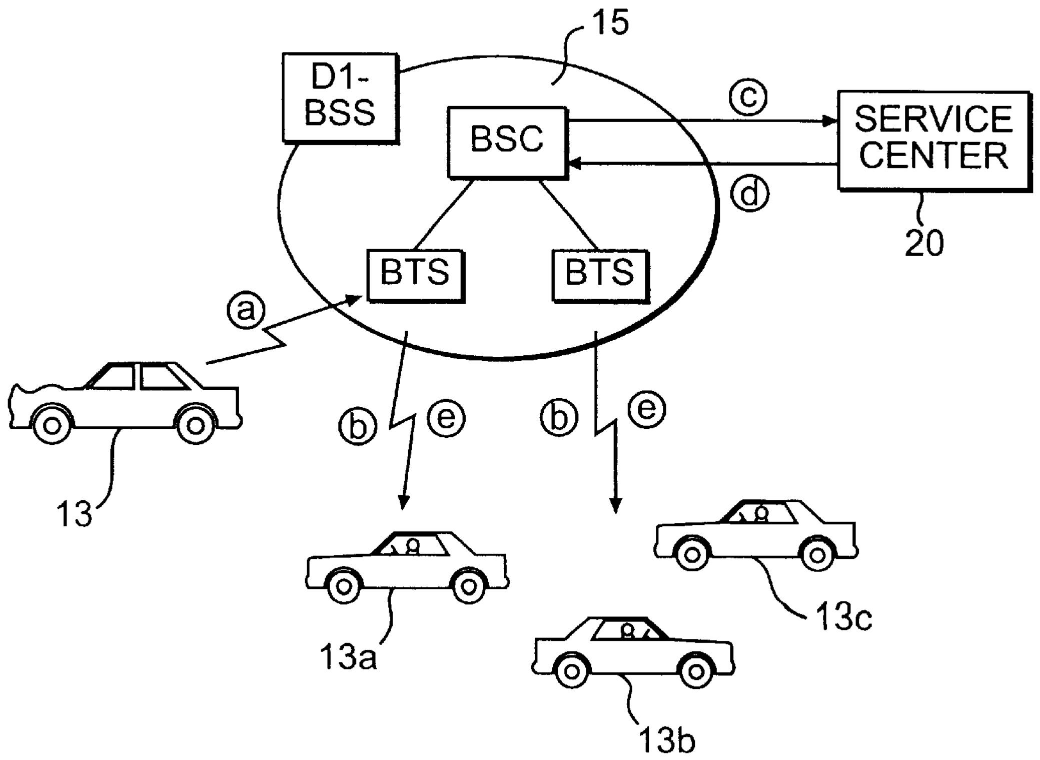
FIG. 4 schematically shows a communication sequence of a direct traffic warning provided by the system of the invention.

Especially in an accident or congestion, it is important to send a traffic warning immediately to all traffic participants who are in the vicinity of the accident or congestion, or who are approaching the event. FIG. 4 illustrates in steps a–e one possible communication sequence for such a direct traffic warning:

a) The terminal of accident vehicle 13 sends a message (position coordinates and other available information about the direction of travel, etc.) to its directly appropriate transmitting and receiving station (base station BTS) of the mobile wireless system.

b) The higher-order network node 15 of the mobile wireless system (for example, the BSC of the GSM systems) analyzes the message and immediately causes a warring signal to be sent to other mobile wireless subscribers (vehicles 13*a*, 13*b*, 13*c*) of the cells of origin and neighboring cells, for example, by the wireless transmission method.

c) The higher-order network node sends the message in parallel to the appropriate service center 20, for example, over DatexP line. The service center performs a check on the message.

d) The service center sends a notice of confirmation or cancellation to the network node (BSC).

e) The network node (BSC) causes the notice of confirmation or cancellation to be sent to the cells of origin and the neighboring cells.

To analyze the warning signals, the receivers 13*a*, 13*b*, 13*c* must be equipped with an appropriate terminal according to this invention. Accident information, such as the position of the accident, is compared with the vehicle's own position. If a relevance is detected (approach to the accident site), this is conveyed via a human-machine interface. This can be done visually and/or acoustically (with a verbal warning such as "accident after 2.5 kilometers"). The distance information is updated by means of the on-board satellite-assisted navigation system. Confirmation or cancellation of the traffic report by the service center 20 is displayed acoustically and/or visually accordingly. The information is transmitted, for example, over a signaling channel of the GSM mobile wireless system available throughout Europe.

B. Required Basic Functions of the Terminal

The traffic telematics terminals of this invention preferably consist of the following functional units:

1. Self-positioning by known GPS methods and improved algorithms.

2. Functions of the application software:

automatic operation, receipt of basic data, determination of the travel through a predefined segment of roadway, determination of the current speed or travel time between two positions, detection of set events (braking, accelerating), plausibility check or processing of the optional additional information (lights, ABS, windshield wipers), generation of traffic flow message, generation of optional additional information (light, ABS, windshield wipers), generation of the time, communications management for automatic operation of the GSM terminal.

3. GSM communication interface for mobile wireless data transmission and optional brief messages (SMS MO and MT) and distributed messages (SMS CB), optionally expandable to telephone (speech).

4. Human-machine interface (operator's terminal), only basic elements are required.

5. Optional:

Upgrading to an emergency call terminal and/or a fully functional dynamic navigation system.

C. Functions of the Control Center

Control center 20 contains a digital road map of the acquisition region in the granularity of the roadway classes (BAB, national highways, regional highways, city and rural roads) and with system-specific attributes of the individual segments of roadway (such as average travel time, parking places, etc.).

FIG. 1 illustrates the functions that are to be performed by control center 20. The control center is responsible for management of communication for the incoming dynamic traffic flow information from the various terminals (1, 2, 3), with or without being equipped with digital road maps. Likewise, the information from existing traditional data acquisition systems, for example, induction loops 4, can also go to control center 20. Communication with the terminals goes, for example, over a GSM system, such as the D1 system. The information received is recognized in special communications server 5, processed and stored in service server 6 for further processing and assigned to certain roadway segments in database 7. In the process, a check for plausibility 8 and an adjustment are performed by means of the traffic flow information obtained via infrastructure systems 4 (induction loops, for example) on the roads. The data flow to the terminals is bi-directional, so that system server 9 can send current processed information directly back to individual terminals or all respective terminals. Furthermore, interfaces 10, 11 with third party agencies, whether public or private, are also provided for relaying the information further.

Through a knowledge of the historical traffic information and the prevailing traffic situation, service center 20 dynamically controls the segments of roadway to be covered and the attributes to be compiled, such as speed, signal threshold, traffic count, etc. It issues specific data acquisition instructions to vehicles in particular regions selected on the basis of historical traffic information. The information returned by the vehicles is processed and worked up and made available in a suitable form to mobile wireless subscribers and/or third parties.

In view of the above description of this invention, modifications and improvements may occur to those skilled in this technical field which are within the definition of the accompanying claims. The invention is to be limited only by the spirit and scope of the claims and reasonable equivalents thereof.

What is claimed is:

1. A process for mobile wireless acquisition, in a service center and in a terminal in a vehicle, of dynamic traffic information in a roadway system, the process comprising the steps of:

determining, in the terminal provided in the vehicle, the vehicle's position;

detecting, in the terminal provided in the vehicle, additional traffic-relevant attributes;

relaying information obtained in at least one of the determining step and the detecting step over a mobile wireless telecommunication system to at least one of a group comprising other mobile wireless subscribers and the service center;

compiling long-term traffic information in the vehicle;

controlling the acquisition of traffic information in the vehicle by reaching virtual data acquisition points in the roadway system; and compiling a historical traffic database in the service center at least in part from the long-term traffic information compiled in the vehicle.

2. The process according to claim 1, wherein a plausibility check of the data compiled is performed in the service center and optionally a message confirming the accuracy of the information or a cancellation message is sent to selected mobile wireless subscribers.

3. A process for mobile wireless acquisition, in a service center and in a terminal in a vehicle, of dynamic traffic information in a roadway system the process comprising the steps of:

determining, in the terminal provided in the vehicle, the vehicle's position;

detecting, in the terminal provided in the vehicle, additional traffic-relevant attributes;

relaying information obtained in at least one of the determining step and the detecting step over a mobile wireless telecommunication system to at least one of a group comprising other mobile wireless subscribers and the service center;

compiling long-term traffic information in the vehicle;

controlling the acquisition of traffic information in the vehicle by reaching virtual data acquisition points in the roadway system; and compiling a historical traffic database in the service center at least in part from the long-term traffic information compiled in the vehicle;

wherein the detecting step is accomplished by remote scanning conducted at least in part for certain segments of roadway, where stationary and/or dynamically variable acquisition areas are defined, in and/or between which the data acquisition takes place.

4. A process for mobile wireless acquisition, in a service center and in a terminal in a vehicle, of dynamic traffic information in a roadway system, the process comprising the steps of:

determining, in the terminal provided in the vehicle, the vehicle's position;

detecting, in the terminal provided in the vehicle, additional traffic-relevant attributes;

relaying information obtained in at least one of the determining step and the detecting step over a mobile wireless telecommunication system to at least one of a group comprising other mobile wireless subscribers and the service center;

compiling long-term traffic information in the vehicle;

controlling the acquisition of traffic information in the vehicle by reaching virtual data acquisition points in the roadway system; and compiling a historical traffic database in the service center at least in part from the long-term traffic information compiled in the vehicle;

wherein an event-based standard data acquisition is performed at least in part, where a return message is sent back to the service center only after one or more predefined events occurs.

5. The process according to claim 1 or 2, wherein traffic-relevant attributes are compiled by remote scanning from the service center to selected vehicles, where the selection is preferably based on historical traffic information.

6. The process according to claim 1 or 2, wherein the information processed by the service center as well as events and information relevant to an inquiry for traffic management are transmitted to the terminals of one or more mobile wireless subscribers and/or third parties.

7. The process according to claim 1 or 2, wherein attributes of partial segments traveled by individual traffic participants are stored temporarily.

8. The process according to claim 1 or 2, wherein the data communication between the mobile wireless subscriber and the mobile wireless system takes place over a signaling channel.

9. The process according to claim 1 or 2, wherein the traffic-relevant attributes include at least the position and speed of the vehicle as well as time information.

10. The process according to claim 1 or 2, wherein vehicle attributes are also detected.

11. The process according to claim 1 or 2, wherein the service center also uses information available from other traffic information acquisition systems.

12. The process according to claim 1 or 2, wherein the traffic information compiled is correlated in the control center with a digitally stored road map.

13. The process according to claim 1 or 2, wherein software for operation of the terminal is made available by chip map, separate mechanical interfaces or mobile wireless interfaces.

14. The process according to claim 1, wherein the control center permits optimization of the data acquisition process and traffic flow regulation by data distribution communication with the terminal.

15. The process according to claim 1 or 2, wherein collections of mobile wireless subscribers are used for controlling and determining dynamic traffic information over mobile wireless system functions.

16. A system for mobile wireless acquisition of dynamic traffic information in a roadway system, the traffic information acquisition system comprising:

a service center comprising memory and data processing elements;

at least one mobile terminal in a vehicle;

a mobile wireless telecommunication system by means of which said mobile terminal and said service center are in mutual communication;

detectors in the vehicle for sensing traffic-relevant factors and for communicating the factors to said service center by means of said telecommunication system;

a compilation element in said mobile terminal to compile and store long-term traffic information;

a mobile terminal controller structured to control the acquisition of traffic information in said mobile terminal when the vehicle reaches virtual data acquisition locations in the roadway system; and a compilation element in said service center to compile a historical traffic database at least from the long-term traffic information gathered.

17. The system according to claim 16, and further comprising an automatic navigation device.

18. The system according to claim 16, and further comprising an emergency call terminal.

19. The system according to claim 16, wherein said mobile wireless telecommunication system provides communication between said mobile terminal and similar mobile terminals in other vehicles.

20. A process for compiling traffic information in a vehicle, the process comprising the steps of:

determining the vehicle's position;

acquiring traffic-relevant attributes based on the vehicle's position; and compiling long-term traffic information in the vehicle based on the traffic-relevant attributes.

21. The process according to claim 20 further comprising the step of controlling the acquisition of traffic-relevant attributes based on the position of the vehicle relative to locations of virtual data acquisition points.

22. A process for mobile wireless acquisition, in a service center, of dynamic traffic information relating to a roadway system, the process comprising the steps of:

compiling long-term traffic information in a plurality of vehicles that travel on the roadway system;

sending the long-term traffic information over a mobile wireless telecommunication system from the plurality of vehicles to the service center; and compiling a historical traffic database in the service center at least in part from the long-term traffic information received by the service center through the mobile wireless system.

* * * * *